United States Patent
Maeda

(10) Patent No.: US 11,040,401 B2
(45) Date of Patent: Jun. 22, 2021

(54) THROWAWAY INSERT AND METHOD OF GRINDING CUTTING EDGE OF THROWAWAY INSERT

(71) Applicant: SUMITOMO ELECTRIC SINTERED ALLOY, LTD., Takahashi (JP)

(72) Inventor: Kazuo Maeda, Takahashi (JP)

(73) Assignee: Sumitomo Electric Sintered Alloy, Ltd., Takahashi (JP)

( * ) Notice: Subject to any disclaimer, the term of this patent is extended or adjusted under 35 U.S.C. 154(b) by 0 days.

(21) Appl. No.: 16/067,933

(22) PCT Filed: Oct. 25, 2016

(86) PCT No.: PCT/JP2016/081619
§ 371 (c)(1),
(2) Date: Jul. 3, 2018

(87) PCT Pub. No.: WO2017/119176
PCT Pub. Date: Jul. 13, 2017

(65) Prior Publication Data
US 2019/0232453 A1   Aug. 1, 2019

(30) Foreign Application Priority Data
Jan. 5, 2016   (JP) .............................. JP2016-000636

(51) Int. Cl.
*B23B 27/14*   (2006.01)
(52) U.S. Cl.
CPC ...... *B23B 27/145* (2013.01); *B23B 2200/049* (2013.01); *B23B 2226/125* (2013.01); *B23B 2226/31* (2013.01)

(58) Field of Classification Search
CPC ..... B23B 27/145; B23B 27/141; B23B 27/14; B23B 27/143; B23B 27/18; B23B 27/20;
(Continued)

(56) References Cited

U.S. PATENT DOCUMENTS 4,906,528 A * 3/1990 Cerceau .................... B22F 7/06
419/12
5,078,551 A * 1/1992 Oomen ................... B23B 27/20
125/36
(Continued)

FOREIGN PATENT DOCUMENTS

DE   4302645 A1 * 8/1994   ......... B23B 27/1622
DE   3844007 C2 * 12/1996   ........... B23B 27/145
(Continued)

OTHER PUBLICATIONS

Description DE3844007 (translation) obtained at https://worldwide.espacenet.com/ (last visited Jul. 27, 2020).*

*Primary Examiner* — Ryan C Rufo
(74) *Attorney, Agent, or Firm* — Baker Botts L.L.P.; Michael A. Sartori

(57) ABSTRACT

A throwaway insert includes a base and a cutting edge member. The cutting edge member includes: a rake face; a flank face extending to cross the rake face; a first connecting face connecting the flank face to a side surface of the base and extending to cross the rake face; and a first ridgeline formed by the rake face and the flank face and serving as a cutting edge. When viewed in a plan view from the upper surface of the base, the flank face and the first connecting face are located external to the base. A second ridgeline formed by the rake face and the first connecting face crosses the first ridgeline at an obtuse angle.

12 Claims, 7 Drawing Sheets

(58) Field of Classification Search
CPC .......... B23B 2226/125; B23B 2226/31; B23B 2226/315; B23C 2226/125; B23C 2226/315
See application file for complete search history.

(56) References Cited

U.S. PATENT DOCUMENTS

| | | | | |
|---|---|---|---|---|
| 6,155,755 | A * | 12/2000 | Kanada | ............ B23B 27/18 407/118 |
| 10,413,978 | B2 * | 9/2019 | Deguchi | ............ B23C 5/2208 |
| 10,442,016 | B2 * | 10/2019 | Yamamoto | ............ B23C 5/207 |
| 2002/0071187 | A1 * | 6/2002 | Kono | ............ B29C 33/42 359/742 |
| 2004/0228694 | A1 * | 11/2004 | Webb | ............ B23B 27/145 407/113 |
| 2007/0033810 | A1 * | 2/2007 | Sumiya | ............ B01J 3/06 30/165 |
| 2010/0003091 | A1 * | 1/2010 | Muraki | ............ B23B 27/20 407/119 |
| 2013/0309025 | A1 * | 11/2013 | Zimmermann | ............ B23C 5/22 407/11 |
| 2017/0028478 | A1 * | 2/2017 | Fiori | ............ B23B 27/1611 |
| 2017/0106455 | A1 * | 4/2017 | Koike | ............ B23C 5/2472 |

FOREIGN PATENT DOCUMENTS

| | | | | |
|---|---|---|---|---|
| DE | 19919123 | A1 * | 11/2000 | ............ B23B 27/141 |
| EP | 0590408 | A1 * | 4/1994 | ............ B23C 5/08 |
| FR | 1085732 | A * | 2/1955 | ............ B23B 27/18 |
| FR | 2706339 | A3 * | 12/1994 | ............ B23C 5/2269 |
| JP | S58-004302 | A | 1/1983 | |
| JP | S62-024903 | A | 2/1987 | |
| JP | S63-201045 | U | 12/1988 | |
| JP | H01-183349 | A | 7/1989 | |
| JP | H01-164003 | U1 | 11/1989 | |
| JP | H04-183563 | A | 6/1992 | |
| JP | H05-000302 | U | 1/1993 | |
| JP | H05-057608 | A | 3/1993 | |
| JP | H10-193203 | A | 7/1998 | |
| JP | H11-156607 | A | 6/1999 | |
| JP | H11-320219 | A | 11/1999 | |
| JP | 2004-338033 | A | 12/2004 | |
| JP | 2009-202244 | A | 9/2009 | |
| JP | 1405583 | S | 1/2011 | |
| JP | 1419424 | S | 7/2011 | |
| JP | 1431524 | S | 1/2012 | |
| JP | 2014-240096 | A | 12/2014 | |
| WO | WO-0153026 | A1 * | 7/2001 | ............ B23B 27/145 |
| WO | WO-2011157252 | A1 * | 12/2011 | ............ B24B 3/34 |

* cited by examiner (A)

(B)

THROWAWAY INSERT AND METHOD OF GRINDING CUTTING EDGE OF THROWAWAY INSERT

TECHNICAL FIELD

The present invention relates to a throwaway insert and a method of grinding a cutting edge of the throwaway insert. The present application claims a priority based on Japanese Patent Application No. 2016-000636 filed on Jan. 5, 2016, the entire content of which is incorporated herein by reference.

BACKGROUND ART

Patent Document 1 (Japanese Patent Laying-Open No. 11-320219) discloses a throwaway insert including: a base (base material) having a corner portion provided with a recess; and a cutting edge member (hard sintered material) joined to the recess. The cutting edge member includes: an upper surface; a first side surface flush with a side surface of the base; and a second side surface facing a side surface of the recess.

This cutting edge member includes: a first ridgeline formed by the upper surface and the first side surface and serving as a cutting edge; and a second ridgeline formed by the upper surface and the second side surface. The first ridgeline crosses the second ridgeline at an acute angle.

CITATION LIST

Patent Document

PTD 1: Japanese Patent Laying-Open No. 11-320219

SUMMARY OF INVENTION

A throwaway insert according to one embodiment of the present invention includes a base and a cutting edge member. The base has an upper surface, a lower surface, and a plurality of side surfaces that connect the upper surface and the lower surface to each other, and the base is provided with a first recess at a corner portion at which the upper surface crosses two side surfaces of the plurality of side surfaces. The cutting edge member is joined to the first recess. The cutting edge member includes: a rake face extending along the upper surface; a flank face extending to cross the rake face; a first connecting face connecting the flank face to one side surface of the two side surfaces and extending to cross the rake face; and a first ridgeline formed by the rake face and the flank face and serving as a cutting edge. When viewed in a plan view from the upper surface of the base, the flank face and the first connecting face are located external to the base. A second ridgeline formed by the rake face and the first connecting face crosses the first ridgeline at an obtuse angle.

A method of grinding a cutting edge of a throwaway insert according to one embodiment of the present invention includes: holding the above-described throwaway insert at a holder for grinding; and grinding the flank face of the cutting edge member using a grindstone while moving the grindstone relative to the cutting edge member. The grinding of the flank face includes grinding a portion of the flank face into a protruding curved surface.

BRIEF DESCRIPTION OF DRAWINGS

FIG. 10 (B) is a schematic cross sectional view of the throwaway insert according to the first embodiment after grinding.

FIG. 11 (B) is a schematic cross sectional view of the throwaway insert according to the comparative example after grinding.

DESCRIPTION OF EMBODIMENTS

Figure 1:
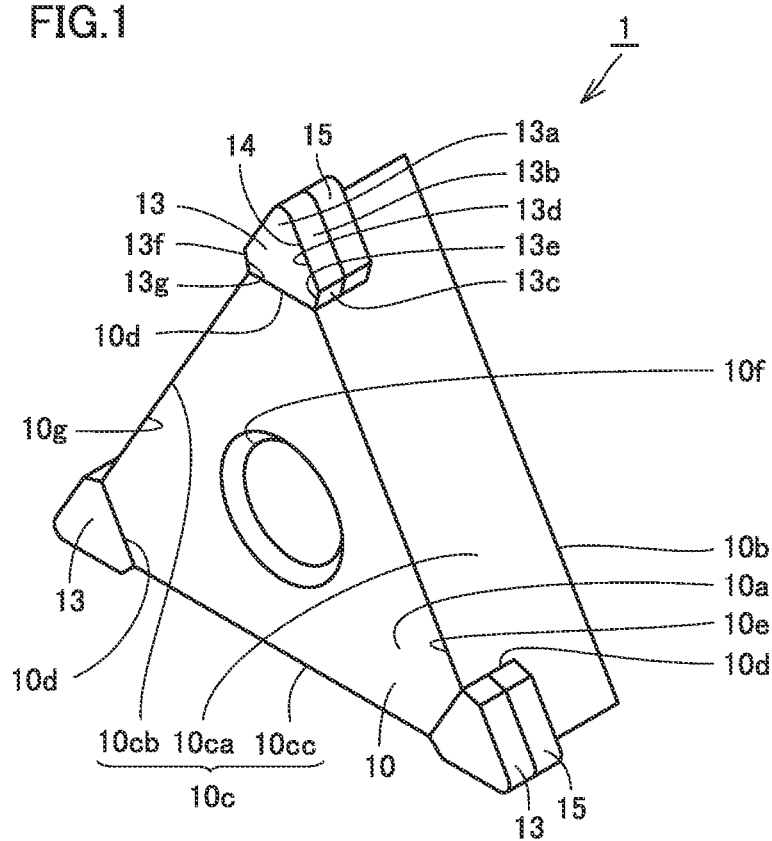
FIG. 1 is a schematic perspective view of a throwaway insert according to a first embodiment.
Figure 2:
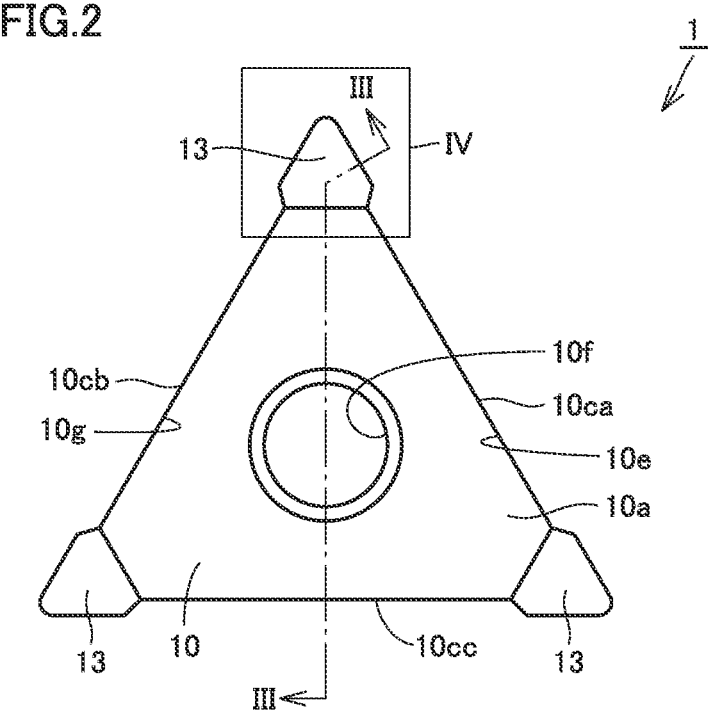
FIG. 2 is a schematic top view of the throwaway insert according to the first embodiment.

Problem to be Solved by the Present Disclosure

When a damage portion is generated in a cutting edge member of a throwaway insert, the cutting edge member is ground to remove the damage portion so as to reuse the cutting edge member. In the throwaway insert described in Patent Document 1, the first ridgeline serving as the cutting edge crosses the second ridgeline at an acute angle. Hence, strength is low at an end portion of the cutting edge member, i.e., a region at which the first side surface and the second side surface cross each other. Accordingly, when the cutting edge member of the throwaway insert described in Patent Document 1 is ground, the end portion of the cutting edge member is likely to be chipped. Moreover, in the throwaway insert described in Patent Document 1, it is difficult to increase the number of times of reusing the cutting edge member.

The present invention has been made to solve the above-described problem, and has an object to provide a throwaway insert having stable quality and including a cutting edge member that can be reused a larger number of times, as well as a method of grinding a cutting edge of the throwaway insert.

Advantageous Effect of the Present Disclosure

According to the description above, there can be provided a throwaway insert having stable quality and including a cutting edge member that can be reused a larger number of times, as well as a method of grinding a cutting edge of the throwaway insert.

DESCRIPTION OF EMBODIMENT OF THE PRESENT INVENTION

First, embodiments of the present invention are listed and described.

(1) A throwaway insert (1, 2) according to one embodiment of the present invention includes a base (10) and a cutting edge member (13). The base (10) has an upper surface (10a), a lower surface (10b), and a plurality of side surfaces (10c) that connect the upper surface (10a) and the lower surface (10b) to each other, and the base (10) is provided with a first recess (10d) at a corner portion at which the upper surface (10a) crosses two side surfaces (10ca, 10cb) of the plurality of side surfaces (10c). The cutting edge member (13) is joined to the first recess (10d). The cutting edge member (13) includes: a rake face (13a) extending along the upper surface (10a); a flank face (13b) extending to cross the rake face (13a); a first connecting face (13c) connecting the flank face (13b) to one side surface (10ca) of the two side surfaces (10ca, 10cb) and extending to cross the rake face (13a); and a first ridgeline (13d) formed by the rake face (13a) and the flank face (13b) and serving as a cutting edge (14). When viewed in a plan view from the upper surface (10a) of the base (10), the flank face (13b) and the first connecting face (13c) are located external to the base (10). A second ridgeline (13e) formed by the rake face (13a) and the first connecting face (13c) crosses the first ridgeline (13d) at an obtuse angle. Accordingly, the throwaway insert (1, 2) has stable quality and the cutting edge member (13) of the throwaway insert (1, 2) can be reused a larger number of times.

(2) In the throwaway insert (1, 2) according to (1), the first ridgeline (13d) may include a first straight cutting edge portion (14a) connected to the second ridgeline (13e). The first straight cutting edge portion (14a) may be parallel to a third ridgeline (10e) formed by the upper surface (10a) of the base (10) and the one side surface (10ca) of the base (10).

Each of the plurality of side surfaces (10c) of the base (10) is positioned precisely. When at least two of the plurality of side surfaces (10c) of the base (10) are bound to a holder (30) for cutting or a holder (60) for grinding, the one side surface (10ca) of the base (10) can be used as a reference for checking a position of the cutting edge member (13). Therefore, by checking the position of the cutting edge member (13) including the cutting edge (14) relative to a workpiece (40) while observing a correlation between the first straight cutting edge portion (14a) of the cutting edge member (13) and the one side surface (10ca) of the base (10) including the third ridgeline (10e) parallel to the first straight cutting edge portion (14a), the cutting edge member (13) including the cutting edge (14) can be positioned relative to the workpiece (40) with high precision. This leads to improved precision in cutting the workpiece (40) by the throwaway insert (1, 2).

By checking the position of the cutting edge member (13) including the cutting edge (14) relative to a grindstone (51) while observing a correlation between the first straight cutting edge portion (14a) of the cutting edge member (13) and the one side surface (10ca) of the base (10) including the third ridgeline (10e) parallel to the first straight cutting edge portion (14a), the cutting edge member (13) including the cutting edge (14) can be positioned relative to the grindstone (51) with high precision. This leads to improved precision in grinding the cutting edge member (13), thereby obtaining a high-quality cutting edge (14).

(3) In the throwaway insert (1, 2) according to (2), a distance between the first ridgeline (13d) and the third ridgeline (10e) when viewed in the plan view from the upper surface (10a) of the base (10) may be more than or equal to 0.01 mm and less than or equal to 1 mm.

By setting, at less than or equal to 1 mm, the distance between the first ridgeline (13d) and the third ridgeline (10e) when viewed in the plan view from the upper surface (10a) of the base (10), the rigidity of the cutting edge member (13) can be suppressed from being decreased, and the cutting edge member (13) can be suppressed from being chipped during cutting of the workpiece (40). Accordingly, the throwaway insert (1, 2) has stable quality. Since the rigidity of the cutting edge member (13) can be suppressed from being decreased, occurrence of chatter vibration can be prevented during cutting of the workpiece (40). Therefore, decrease in cutting precision can be suppressed while securing minimally required cutting performance.

Moreover, by setting, at more than or equal to 0.01 mm, the distance between the first ridgeline (13d) and the third ridgeline (10e) when viewed in the plan view from the upper surface (10a) of the base (10), the flank face (13b) of the cutting edge member (13) is ground without grinding the base (10), whereby a damage portion (17) of the cutting edge member (13) can be completely removed. In this way, the cutting edge member (13) can be reused to cut the workpiece (40).

(4) In the throwaway insert (1, 2) according to (1), the cutting edge member (13) may further include a second connecting face (13f) connecting the flank face (13b) to an other side surface (10cb) of the two side surfaces (10ca, 10cb) and extending to cross the rake face (13a). When viewed in the plan view from the upper surface (10a) of the base (10), the second connecting face (13f) may be located external to the base (10). A fourth ridgeline (13g) formed by the rake face (13a) and the second connecting face (13f) may cross the first ridgeline (13d) at an obtuse angle. The first ridgeline (13d) may include a first straight cutting edge portion (14a) connected to the second ridgeline (13e), and a second straight cutting edge portion (14c) connected to the fourth ridgeline (13g). A crossing angle α (degree) between the first ridgeline (13d) and the second ridgeline (13e) may be more than or equal to (160−γ/2) and less than or equal to (200−γ/2), where γ (degree) represents an angle between the first straight cutting edge portion (14a) and the second straight cutting edge portion (14c) when viewed in the plan view from the upper surface (10a) of the base (10).

Since crossing angle α (degree) between the first ridgeline (13d) and the second ridgeline (13e) is more than or equal to (160−γ/2) and less than or equal to (200−γ/2), the length of the first straight cutting edge portion (14a) after grinding the cutting edge member (13) is substantially the same as the length of the first straight cutting edge portion (14a) before grinding the cutting edge member (13). Accordingly, also after grinding the cutting edge member (13), the workpiece (40) can be cut to substantially the same cutting depth as that before grinding the cutting edge member (13).

(5) In the throwaway insert (2) according to any one of (1) to (4), the flank face (13b) of the cutting edge member (13) may be inclined relative to the one side surface (10ca) of the base (10) such that the flank face (13b) of the cutting edge member (13) becomes closer to the one side surface (10ca) of the base (10) in a direction from the upper surface (10a) of the base (10) toward the lower surface (10b) of the base (10). Since the flank face (13b) of the cutting edge member

(13) is inclined relative to the one side surface (10ca) of the base (10), a flank amount of the flank face (13b) of the cutting edge member (13) relative to the surface of the workpiece (40) can be increased. Therefore, wearing of the flank face (13b) of the cutting edge member (13) can be reduced during cutting, thereby improving the life of the throwaway insert (2). Further, since the flank face (13b) of the cutting edge member (13) is inclined relative to the one side surface (10ca) of the base (10), cutting performance of the cutting edge (14) is improved. Therefore, even though the cutting edge member (13) protrudes relative to the one side surface (10ca) of the base (10), occurrence of chatter vibration can be suppressed during cutting of the workpiece (40), whereby cutting precision can be suppressed from being decreased.

(6) In the throwaway insert (2) according to (5), the flank face (13b) of the cutting edge member (13) may be inclined relative to the one side surface (10ca) of the base (10) at an inclination angle $\theta_1$ of more than or equal to 0.1° and less than or equal to 7°. By setting, at more than or equal to 0.1°, inclination angle $\theta_1$ of the flank face (13b) of the cutting edge member (13) relative to the one side surface (10ca) of the base (10), wearing of the flank face (13b) of the cutting edge member (13) and occurrence of chatter vibration can be further suppressed during cutting. By setting, at less than or equal to 7°, inclination angle $\theta_1$ of the flank face (13b) of the cutting edge member (13) relative to the one side surface (10ca) of the base (10), the flank face (13b) of the cutting edge member (13) can be ground while avoiding the grindstone (51) from interfering with the base (10).

(7) In the throwaway insert (1, 2) according to any one of (1) to (6), the cutting edge member (13) may include one of the following materials: diamond, cubic boron nitride, cemented carbide and cermet. Accordingly, the throwaway insert (1, 2) can be used to highly precisely cut workpieces (40) having various hardnesses, such as high-hardness materials or non-iron soft metals.

(8) In the throwaway insert (1, 2) according to any one of (1) to (7), the first ridgeline (13d) may include a curved cutting edge portion (14b) having a protruding curved shape.

(9) A method of grinding a cutting edge (14) of a throwaway insert (1, 2) according to one embodiment of the present invention includes: holding the throwaway insert (1, 2) recited in any one of (1) to (8) at a holder (60) for grinding; and grinding the flank face (13b) of the cutting edge member (13) using a grindstone (51) while moving the grindstone (51) relative to the cutting edge member (13). The grinding of the flank face (13b) may include grinding a portion of the flank face (13b) into a protruding curved surface. Therefore, it is possible to provide a method of grinding a cutting edge (14) of a throwaway insert (1, 2) having stable quality and including a cutting edge member that can be reused a larger number of times. According to the method of grinding the cutting edge (14) of the throwaway insert (1, 2) according to one embodiment of the present invention, the cutting performance of the cutting edge member (13) including the cutting edge (14) is not deteriorated after grinding the cutting edge member (13) including the cutting edge (14).

(10) In the method of grinding the cutting edge (14) of the throwaway insert (1, 2) according to (9), the holder (60) for grinding may be configured to bind two or more side surfaces (10cb, 10cc) of the plurality of side surfaces (10c) of the base (10). Since the two or more side surfaces (10cb, 10cc) of the plurality of side surfaces (10c) of the base (10) of the throwaway insert (1, 2) are bound to the holder (60) for grinding, the cutting edge member (13) can be positioned with high dimensional precision. Accordingly, a high-quality cutting edge (14) is obtained.

DETAILS OF EMBODIMENT OF THE PRESENT INVENTION

The following describes: specific examples of throwaway inserts 1, 2 according to embodiments of the present invention; and specific examples of methods of grinding cutting edges 14 of throwaway inserts 1, 2 according to the embodiments of the present invention. It should be noted that the same configurations are given the same reference characters and are not described repeatedly.

First Embodiment

With reference to FIG. 1 to FIG. 4, a throwaway insert 1 according to the present embodiment mainly includes a base 10 and a cutting edge member 13. Throwaway insert 1 according to the present embodiment may further include a backing body 15.

Figure 5:
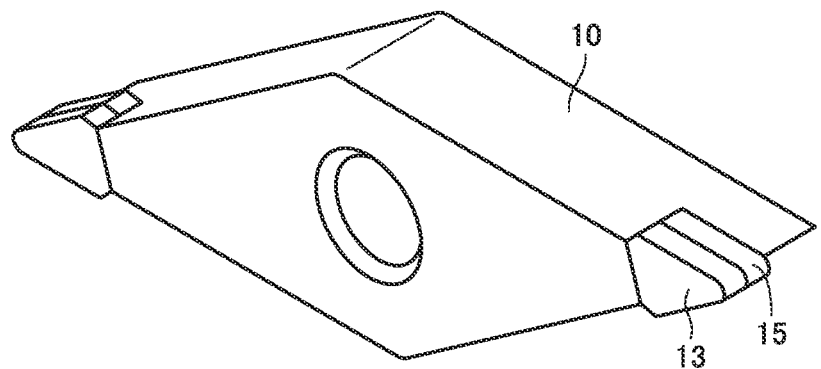
FIG. 5 is a schematic perspective view of a throwaway insert according to a modification of the first embodiment.

Base 10 has an upper surface 10a, a lower surface 10b, and a plurality of side surfaces 10c that connect upper surface 10a and lower surface 10b to each other. In the present embodiment, base 10 may have a regular triangle shape when viewed in a plan view from upper surface 10a of base 10. The plurality of side surfaces 10c may include a side surface 10ca, a side surface 10cb, and a side surface 10cc. Base 10 may have a polygonal shape when viewed in the plan view from upper surface 10a of base 10, such as a rhombus shape (see FIG. 5), a regular pentagon shape, or a regular hexagon shape.

Further, base 10 is provided with a first recess 10d at its corner portion at which upper surface 10a crosses two (for example, side surfaces 10ca, 10cb) of the plurality of side surfaces 10c. Particularly, base 10 is provided with respective first recesses 10d at the following corner portions: a first corner portion at which upper surface 10a crosses two side surfaces 10ca, 10cb of the plurality of side surfaces 10c; a second corner portion at which upper surface 10a crosses two side surfaces 10cb, 10cc of the plurality of side surfaces 10c; and a third corner portion at which upper surface 10a crosses two side surfaces 10cc, 10ca of the plurality of side surfaces 10c. First recess(es) 10d may be provided at one or more corner portion(s) of base 10.

Base 10 further includes: a third ridgeline 10e formed by upper surface 10a and one side surface 10ca of two side surfaces 10ca, 10cb; and a fifth ridgeline 10g formed by upper surface 10a and the other side surface 10cb of two side surfaces 10ca, 10cb. Base 10 is also provided with a through hole 10f extending between the central portion of upper surface 10a and the central portion of lower surface 10b. When attaching throwaway insert 1 to a holder 30 (see FIG. 6 and FIG. 7) for cutting, hole 10f receives a first protrusion 33a of a first pressing member 33 for pressing base 10 against a first holder body 31. When attaching throwaway insert 1 to a holder 60 (see FIG. 8 and FIG. 9) for grinding, hole 10f receives a third protrusion 63a of a second pressing member 63 for pressing base 10 against a second holder body 61. Cemented carbide may be used as a material of base 10. Base 10 may be composed of a material having toughness higher than that of cutting edge member 13.

Cutting edge member 13 is joined to first recess 10d of base 10 using a brazing material or the like. Particularly, respective cutting edge members 13 are joined to the following corner portions: the first corner portion at which upper surface 10a crosses two side surfaces 10ca, 10cb of the plurality of side surfaces 10c; the second corner portion at which upper surface 10a crosses two side surfaces 10cb, 10cc of the plurality of side surfaces 10c; and the third corner portion at which upper surface 10a crosses two side surfaces 10cc, 10ca of the plurality of side surfaces 10c. Cutting edge member(s) 13 may be joined to one or more corner portion(s) of base 10. Cutting edge member 13 includes: a rake face 13a extending along upper surface 10a; a flank face 13b extending to cross rake face 13a; a first connecting face 13c; and a second connecting face 13f.

In the present specification, the expression "rake face 13a extends along upper surface 10a" means that the main extending direction of rake face 13a is the same as the main extending direction of upper surface 10a. Specifically, in FIG. 4, each of the main extending direction of rake face 13a and the main extending direction of upper surface 10a corresponds to an inward direction in the plane of sheet. The expression "rake face 13a extends along upper surface 10a" is intended to encompass both the following cases: a case where rake face 13a is flush with upper surface 10a; and a case where rake face 13a is not flush with upper surface 10a. The expression "rake face 13a extends along upper surface 10a" is intended to encompass both the following cases: a case where rake face 13a is parallel to upper surface 10a; and a case where rake face 13a is not parallel to upper surface 10a.

First connecting face 13c connects flank face 13b to one side surface 10ca of two side surfaces 10ca, 10cb that constitute the corner portion of base 10, and extends to cross rake face 13a. Second connecting face 13f connects flank face 13b to the other side surface 10cb of two side surfaces 10ca, 10cb that constitute the corner portion of base 10, and extends to cross rake face 13a. Cutting edge member 13 further includes: a first ridgeline 13d formed by rake face 13a and flank face 13b and serving as cutting edge 14; a second ridgeline 13e formed by rake face 13a and first connecting face 13c; and a fourth ridgeline 13g formed by rake face 13a and second connecting face 13f.

Figure 4:
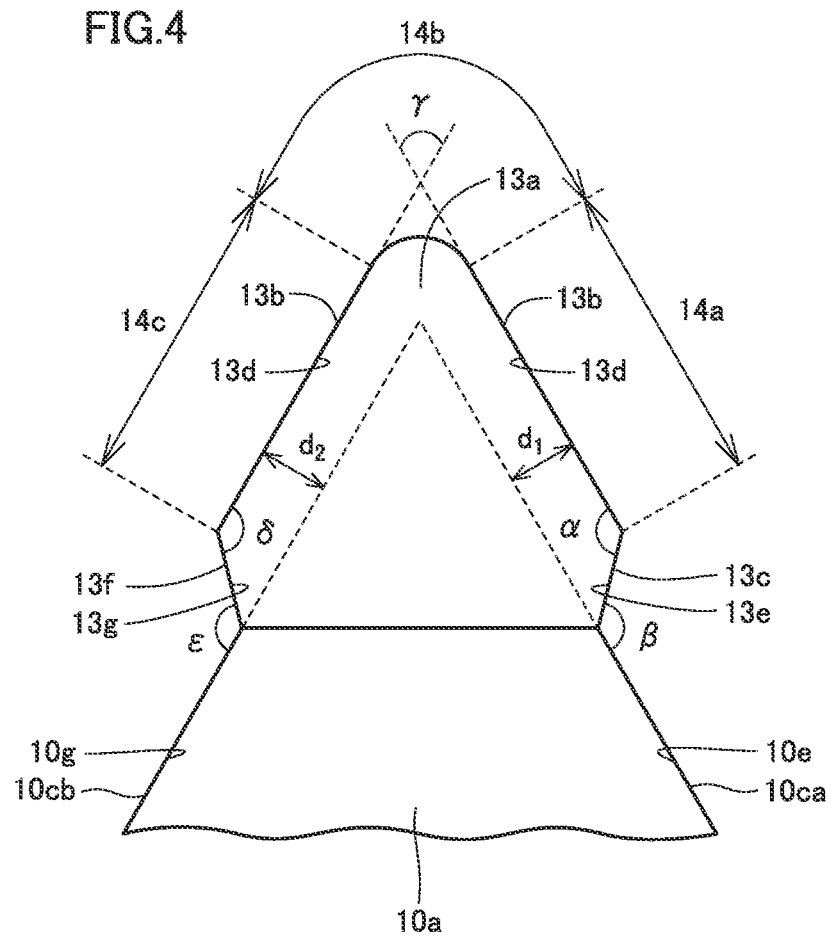
FIG. 4 is a schematic enlarged view of the throwaway insert according to the first embodiment at a region IV shown in FIG. 2.

With reference to FIG. 4, first ridgeline 13d may have a first straight cutting edge portion 14a, a second straight cutting edge portion 14c, and a curved cutting edge portion 14b. First straight cutting edge portion 14a is connected to second ridgeline 13e. Second straight cutting edge portion 14c is connected to fourth ridgeline 13g. Curved cutting edge portion 14b is located between first straight cutting edge portion 14a and second straight cutting edge portion 14c, and is connected to first straight cutting edge portion 14a and second straight cutting edge portion 14c.

First straight cutting edge portion 14a may be parallel to third ridgeline 10e. A distance $d_1$ (see FIG. 4) between first ridgeline 13d and third ridgeline 10e when viewed in the plan view from upper surface 10a of base 10 is desirably more than or equal to 0.01 mm and less than or equal to 1 mm, and is more desirably more than or equal to 0.1 mm and less than or equal to 0.6 mm. In the present specification, distance $d_1$ between first ridgeline 13d and third ridgeline 10e when viewed in the plan view from upper surface 10a of base 10 is defined as a distance between first ridgeline 13d and an extension line (dotted line shown in FIG. 4) of third ridgeline 10e when upper surface 10a of base 10 is viewed in a direction perpendicular to upper surface 10a of base 10.

Second straight cutting edge portion 14c may be parallel to fifth ridgeline 10g. A distance $d_2$ (see FIG. 4) between first ridgeline 13d and fifth ridgeline 10g when viewed in the plan view from upper surface 10a of base 10 is desirably more than or equal to 0.01 mm and less than or equal to 1 mm, and is more desirably more than or equal to 0.1 mm and less than or equal to 0.6 mm. In the present specification, distance $d_2$ between first ridgeline 13d and fifth ridgeline 10g when viewed in the plan view from upper surface 10a of base 10 is defined as a distance between first ridgeline 13d and an extension line (dotted line shown in FIG. 4) of fifth ridgeline 10g when upper surface 10a of base 10 is viewed in the direction perpendicular to upper surface 10a of base 10. Distance $d_2$ between first ridgeline 13d and fifth ridgeline 10g when viewed in the plan view from upper surface 10a of base 10 may be equal to distance $d_1$ between first ridgeline 13d and third ridgeline 10e when viewed in the plan view from upper surface 10a of base 10.

Curved cutting edge portion 14b has a protruding curved shape. Particularly, curved cutting edge portion 14b may have a protruding arc shape.

When viewed in the plan view from upper surface 10a of base 10, flank face 13b, first connecting face 13c, and second connecting face 13f are located external to base 10. When viewed in the plan view from upper surface 10a of base 10, cutting edge member 13 may cover first recess 10d entirely. When viewed in the plan view from upper surface 10a of base 10, second ridgeline 13e crosses first ridgeline 13d at an obtuse angle α. Crossing angle α between first ridgeline 13d and second ridgeline 13e is desirably more than or equal to 110° and less than or equal to 165°, and is more desirably more than or equal to 130° and less than or equal to 150°. An angle between second ridgeline 13e and third ridgeline 10e when viewed in the plan view from upper surface 10a of base 10 is desirably more than or equal to 110° and less than or equal to 165°, and is more desirably more than or equal to 130° and less than or equal to 150°. Angle β between second ridgeline 13e and third ridgeline 10e may be equal to crossing angle α between first ridgeline 13d and second ridgeline 13e.

When viewed in the plan view from upper surface 10a of base 10, fourth ridgeline 13g crosses first ridgeline 13d at an obtuse angle δ. Crossing angle δ between first ridgeline 13d and fourth ridgeline 13g is desirably more than or equal to 110° and less than or equal to 165°, and is more desirably more than or equal to 130° and less than or equal to 150°. Crossing angle δ between first ridgeline 13d and fourth ridgeline 10g may be equal to crossing angle α between first ridgeline 13d and second ridgeline 13e. An angle c between fourth ridgeline 13g and fifth ridgeline 10g when viewed in the plan view from upper surface 10a of base 10 is desirably more than or equal to 110° and less than or equal to 165°, and is more desirably more than or equal to 130° and less than or equal to 150°. Angle c between fourth ridgeline 13g and fifth ridgeline 10g may be equal to crossing angle δ between first ridgeline 13d and fourth ridgeline 13g. Angle c between fourth ridgeline 13g and fifth ridgeline 10g may be equal to angle β between second ridgeline 13e and third ridgeline 10e.

In order to cut a workpiece 40, also after grinding cutting edge member 13, to substantially the same cutting depth as the cutting depth before grinding cutting edge member 13, the length of first straight cutting edge portion 14a after grinding cutting edge member 13 is desirably substantially the same as the length of first straight cutting edge portion 14a before grinding cutting edge member 13. Therefore, crossing angle α (degree) between first ridgeline 13d and second ridgeline 13e is preferably more than or equal to (160−γ/2) and less than or equal to (200−γ/2), and is more preferably more than or equal to (170−γ/2) and less than or equal to (190−γ/2), where γ (degree) represents the angle between first straight cutting edge portion 14a and second straight cutting edge portion 14c when viewed in the plan view from upper surface 10a of base 10, i.e., angle between the extension line of first straight cutting edge portion 14a and the extension line of second straight cutting edge portion 14c when viewed in the plan view from upper surface 10a of base 10 (see FIG. 4). In order to cut a workpiece 40, also after grinding cutting edge member 13, to substantially the same cutting depth as the cutting depth before grinding cutting edge member 13, the length of second straight cutting edge portion 14c after grinding cutting edge member 13 is desirably substantially the same as the length of second straight cutting edge portion 14c before grinding cutting edge member 13. Therefore, crossing angle δ (degree) between first ridgeline 13d and fourth ridgeline 13g is preferably more than or equal to (160−γ/2) and less than or equal to (200−γ/2), and is more preferably more than or equal to (170−γ/2) and less than or equal to (190−γ/2).

Cutting edge member 13 may include one of the following materials: diamond, cubic boron nitride (CBN), cemented carbide and cermet. Accordingly, throwaway insert 1 can be used to highly precisely cut workpieces 40 having various hardnesses, such as high-hardness materials or non-iron soft metals. The cutting edge member including the diamond may be a diamond sintered material. The cutting edge member including the cubic boron nitride (CBN) may be a cubic boron nitride (CBN) sintered material including more than or equal to 20 volume % of the cubic boron nitride (CBN). The cemented carbide may include, as a main component, tungsten carbide (WC) having at least one of cobalt (Co), titanium carbide (TiC), titanium nitride (TiN), and titanium carbonitride (TiCN) added therein. The cermet may include titanium carbide (TiC), titanium nitride (TiN), or titanium carbonitride (TiCN) as a main component. Cutting edge member 13 is composed of a material having a hardness higher than that of base 10.

Backing body 15 may be located between first recess 10d of base 10 and cutting edge member 13. Backing body 15 is composed of a material having a toughness higher than that of cutting edge member 13. Since backing body 15 is composed of a material having a toughness higher than that of cutting edge member 13, part of a large load, if any, acting on cutting edge 14 during cutting can be absorbed by backing body 15, thus avoiding this load from being concentrated on cutting edge member 13. Backing body 15 prevents cutting edge 14 from being chipped during the cutting, whereby throwaway insert 1 can be used for a long time. Accordingly, throwaway insert 1 including backing body 15 has more stable quality. Cemented carbide may be used as a material of backing body 15.

Figure 3:
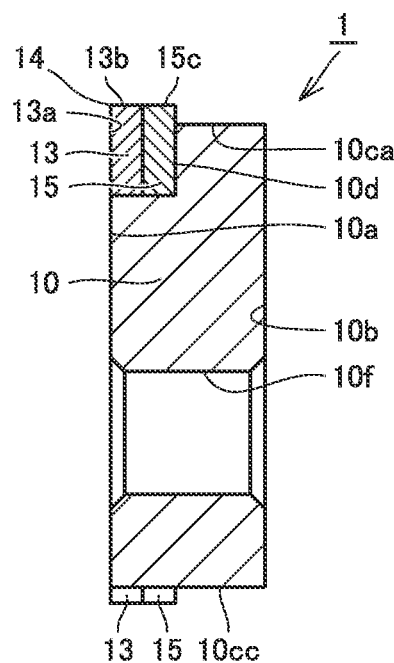
FIG. 3 is a schematic cross sectional view of the throwaway insert according to the first embodiment along a cross sectional line shown in FIG. 2.

Backing body 15 may have a side surface 15c flush with flank face 13b of cutting edge member 13 (see FIG. 3). As one modification of the present embodiment, side surface 15c of backing body 15 is flush with two side surfaces 10ca, 10cb of base 10, and flank face 13b of cutting edge member 13 may protrude relative to two side surfaces 10ca, 10cb of base 10 and side surface 15c of backing body 15. Backing body 15 may be integrated with cutting edge member 13. Cutting edge member 13 and backing body 15 may be a composite sintered material obtained by sintering and shaping cutting edge member 13 and backing body 15 integrally.

The following describes an exemplary method of manufacturing throwaway insert 1 of the present embodiment. The composite sintered material is obtained by sintering and shaping cutting edge member 13 and backing body 15 integrally. This composite sintered material is joined to first recess 10d of base 10 using a brazing material or the like with backing body 15 of this composite sintered material facing first recess 10d of base 10. By grinding flank face 13b including first ridgeline 13d of cutting edge member 13 without grinding base 10, cutting edge 14 is formed at first ridgeline 13d. By the above steps, throwaway insert 1 of the present embodiment can be manufactured.

Figure 6:
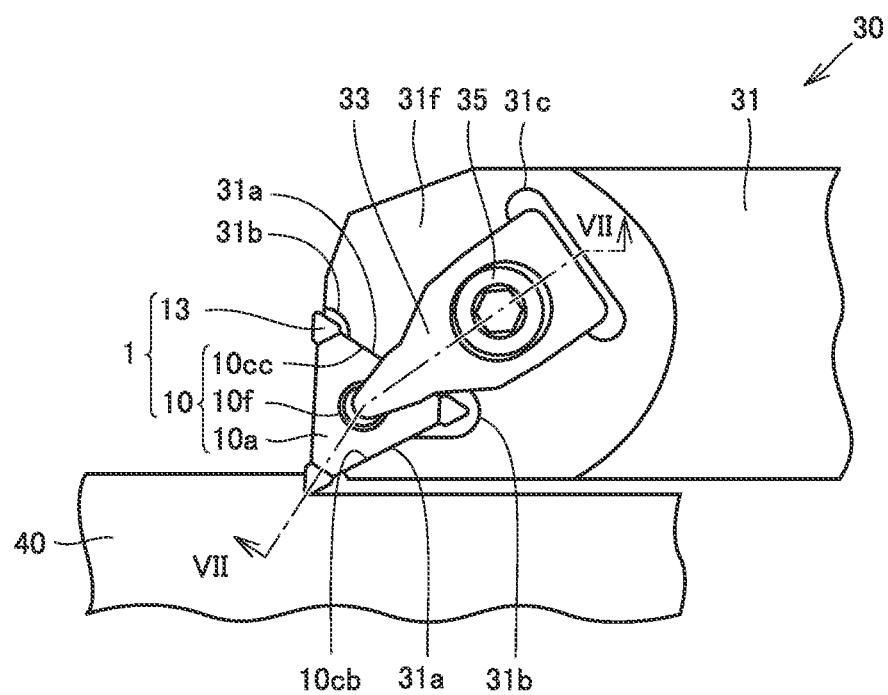
FIG. 6 is a schematic view showing a method of cutting a workpiece using the throwaway insert according to the first embodiment.
Figure 7:
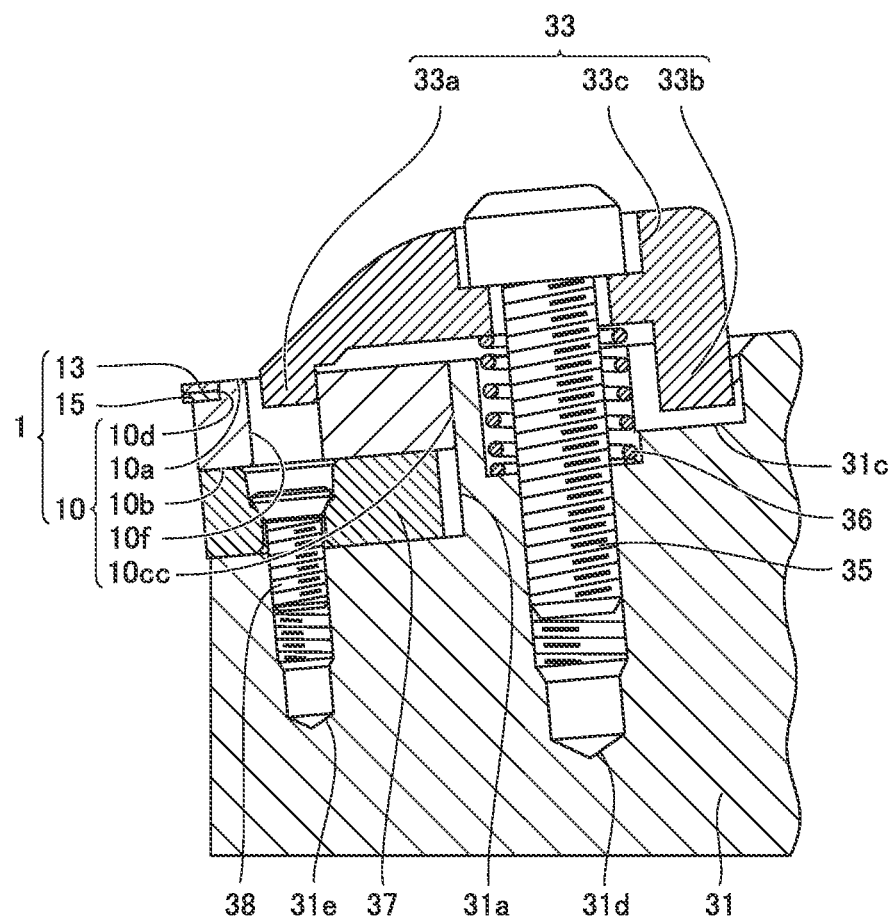
FIG. 7 is a schematic cross sectional view along a cross sectional line VII-VII shown in FIG. 6.

With reference to FIG. 6 and FIG. 7, the following describes an exemplary method of cutting workpiece 40 using throwaway insert 1 of the present embodiment. Throwaway insert 1 is held at holder 30 for cutting. First ridgeline 13d serving as cutting edge 14 of throwaway insert 1 is brought into abutment with workpiece 40 and workpiece 40 is rotated relative to throwaway insert 1, thereby cutting workpiece 40.

The following describes a configuration of holder 30 for cutting and a method of holding throwaway insert 1 at holder 30 for cutting. Holder 30 for cutting may include a first holder body 31, a first pressing member 33, a first screw 35, a first elastic member 36, an underlying plate 37, and a second screw 38.

First holder body 31 may be provided with a second recess 31a, a third recess 31b, a first groove 31c, a second groove 31d, and a third groove 31e, and a swarf pocket 31f. Swarf from workpiece 40 is efficiently discharged through swarf pocket 31f. Swarf pocket 31f is provided at the tip of first holder body 31. Second recess 31a, third recess 31b, first groove 31c, second groove 31d and third groove 31e may be provided in swarf pocket 31f.

Base 10 of throwaway insert 1 is fit in second recess 31a of first holder body 31. Holder 30 (first holder body 31) for cutting binds two or more side surfaces 10cb, 10cc of the plurality of side surfaces 10c of base 10. Holder 30 for cutting is configured not to interfere with cutting edge member 13 of throwaway insert 1. For example, third recess 31b is provided at first holder body 31 such that first holder body 31 does not interfere with cutting edge member 13. Third recess 31b may communicate with second recess 31a.

First pressing member 33 may include a first protrusion 33a and a second protrusion 33b, and may be provided with a first through hole 33c having a step. First protrusion 33a of first pressing member 33 is inserted into hole 10f provided in base 10. Second protrusion 33b of first pressing member 33 is inserted into first groove 31c of first holder body 31.

First screw 35 has a head portion and a waist portion provided with a thread groove. The waist portion of first screw 35 is threaded into second groove 31d of first holder body 31 through first through hole 33c. The head portion of first screw 35 presses the stepped portion of first through hole 33c of first pressing member 33 to the first holder body 31 side.

First elastic member 36, which surrounds the waist portion of first screw 35, is located between first holder body 31 and first pressing member 33. As first elastic member 36, a spring or a washer may be used.

Underlying plate 37 may be disposed between lower surface 10b of base 10 and the bottom surface of second recess 31a of first holder body 31. Particularly, the waist portion of second screw 38 is threaded into third groove 31e of first holder body 31 through a hole extending between the upper and lower surfaces of underlying plate 37. In this way, underlying plate 37 can be fixed onto the bottom surface of second recess 31a of first holder body 31 facing lower surface 10b of base 10. When cutting edge member 13 is damaged, underlying plate 37 prevents damage of the bottom and side surfaces of second recess 31a of first holder body 31. Underlying plate 37 may be composed of cemented carbide.

By threading first screw 35 into second groove 31d of first holder body 31, first pressing member 33 is fixed to first holder body 31, and base 10 is pressed against second recess 31*a* of first holder body 31 by first pressing member 33. As a result, throwaway insert 1 can be held at holder 30 (first holder body 31) for cutting.

Figure 8:
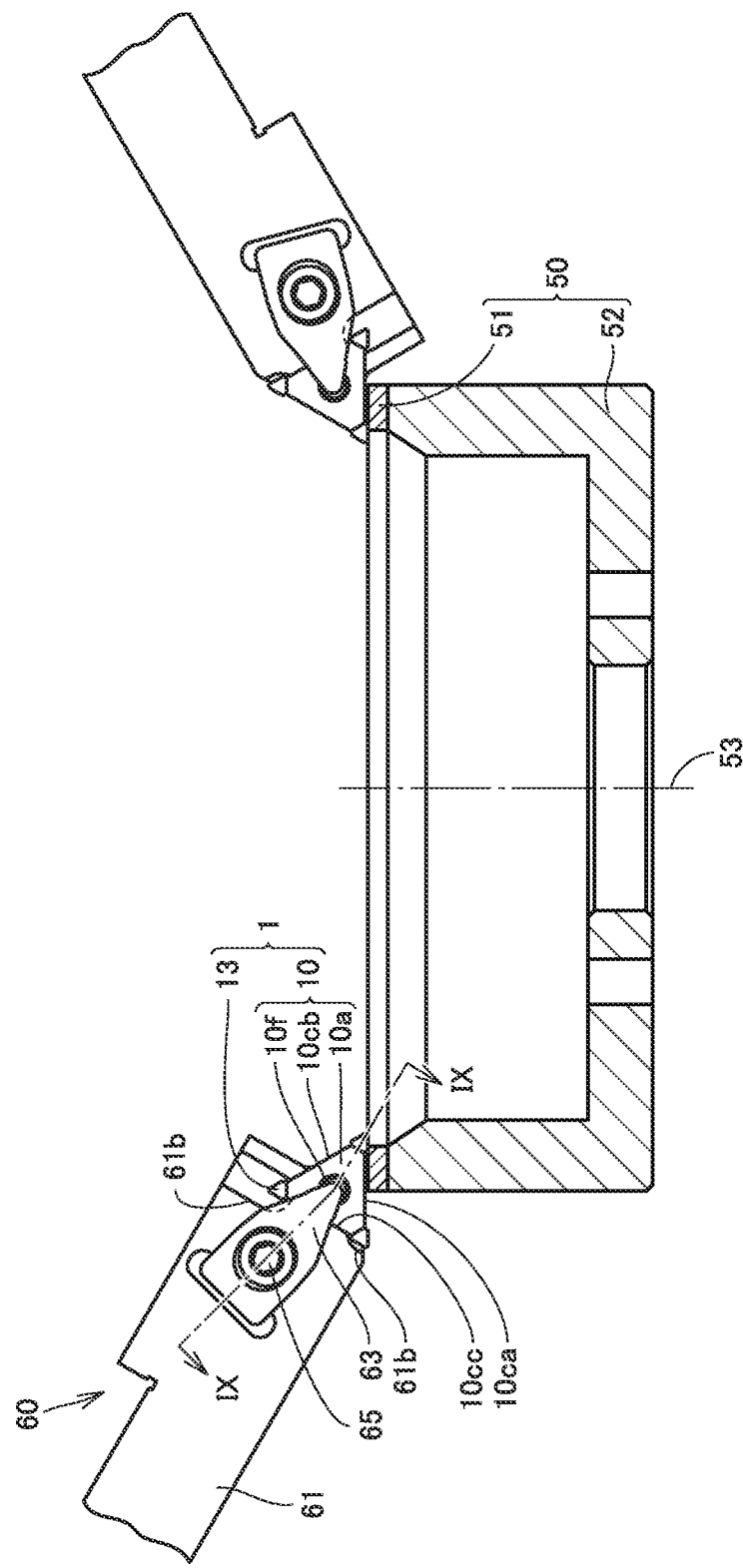
FIG. 8 is a schematic partial cross sectional view showing a method of grinding a cutting edge of the throwaway insert according to the first embodiment.
Figure 9:
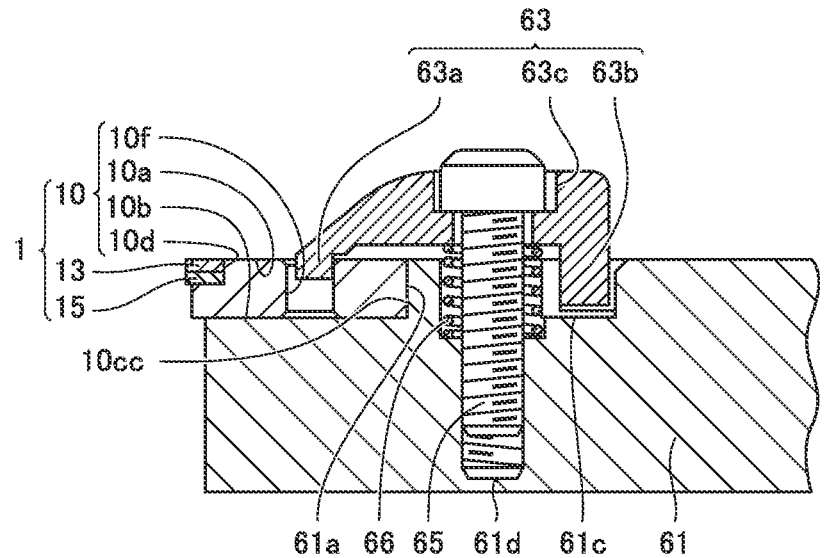
FIG. 9 is a schematic cross sectional view along a cross sectional line IX-IX shown in FIG. 8.
Figure 10:
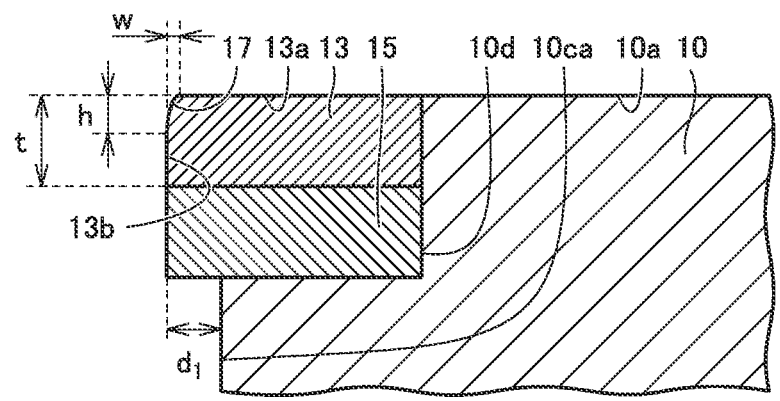
FIG. 10 (A) is a schematic cross sectional view of the throwaway insert according to the first embodiment with a damage portion being generated in a cutting edge member.
Figure 10:
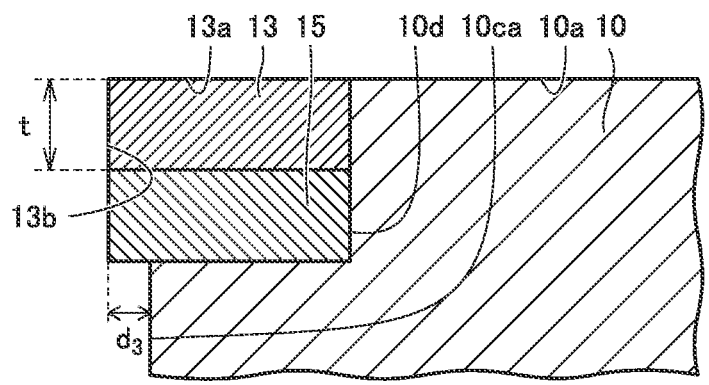

With reference to FIG. 8 to FIG. 10, the following describes an exemplary method of grinding cutting edge 14 of throwaway insert 1 of the present embodiment. Throwaway insert 1 is held at holder 60 for grinding. Flank face 13*b* of cutting edge member 13 of throwaway insert 1 is brought into abutment with a grindstone 51. Grindstone 51 is rotated and moved relative to cutting edge member 13, thereby grinding flank face 13*b* of cutting edge member 13. In this way, damage portion 17 generated in cutting edge member 13 during cutting of workpiece 40 can be removed.

As shown in FIG. 8 and FIG. 9, throwaway insert 1 is held at holder 60 for grinding. Flank face 13*b* of cutting edge member 13 of throwaway insert 1 is brought into abutment with grindstone 51 of a grinding wheel 50. Rake face 13*a* of cutting edge member 13 and base 10 are not brought into abutment with grindstone 51. Grindstone 51 may be composed of diamond or cubic boron nitride (CBN). Grinding wheel 50 includes: grindstone 51; a core 52 on which grindstone 51 is fixed; and a drive mechanism (not shown) for driving core 52.

By the drive mechanism, core 52 is rotated around a rotation axis 53 and is moved in a plane orthogonal to rotation axis 53. By rotating grindstone 51 fixed to core 52 around rotation axis 53 relative to cutting edge member 13 and moving grindstone 51 relative to cutting edge member 13 in the plane orthogonal to rotation axis 53, flank face 13*b* of cutting edge member 13 of throwaway insert 1 is ground using grindstone 51. In this grinding of flank face 13*b*, cutting edge member 13 is ground such that the protruding length of cutting edge member 13 relative to base 10 when viewed in the plan view from upper surface 10*a* of base 10 is decreased (see FIG. 10 (A) and FIG. 10 (B)). Specifically, first straight cutting edge portion 14*a* and second straight cutting edge portion 14*c* may be formed by grinding flank face 13*b* of cutting edge member 13 using grindstone 51 while rotating and grinding grindstone 51 relative to cutting edge member 13. The step of grinding flank face 13*b* of cutting edge member 13 using grindstone 51 while moving grindstone 51 relative to cutting edge member 13 may includes a step of forming curved cutting edge portion 14*b* having a protruding curved shape by grinding a portion of flank face 13*b* of cutting edge member 13 into a protruding curved surface.

With reference to FIG. 8 and FIG. 9, the following describes a configuration of holder 60 for grinding and a method of holding throwaway insert 1 at holder 60 for grinding. Holder 60 for grinding may include a second holder body 61, a second pressing member 63, a third screw 65, and a second elastic member 66.

Second holder body 61 may be provided with a fourth recess 61*a*, a fifth recess 61*b*, a fourth groove 61*c*, and a fifth groove 61*d*. Base 10 of throwaway insert 1 is fit in fourth recess 61*a* of second holder body 61. Holder 60 (second holder body 61) for grinding binds two or more side surfaces 10*cb*, 10*cc* of the plurality of side surfaces 10*c* of base 10. Holder 60 for grinding is configured not to interfere with cutting edge member 13 of throwaway insert 1. For example, fifth recess 61*b* is provided at second holder body 61 such that second holder body 61 does not interfere with cutting edge member 13. Fifth recess 61*b* may communicate with fourth recess 61*a*.

Second pressing member 63 may include a third protrusion 63*a* and a fourth protrusion 63*b*, and may be provided with a second through hole 63*c* having a step. Third protrusion 63*a* of second pressing member 63 is inserted into hole 10*f* provided in base 10. Fourth protrusion 63*b* of second pressing member 63 is inserted into fourth groove 61*c* of second holder body 61.

Third screw 65 has a head portion and a waist portion provided with a thread groove. The waist portion of third screw 65 is threaded into fifth groove 61*d* of second holder body 61 through second through hole 63*c*. The head of third screw 65 presses the stepped portion of second through hole 63*c* of second pressing member 63 to the second holder body 61 side.

Second elastic member 66, which surrounds the waist portion of third screw 65, is located between second holder body 61 and second pressing member 63. As second elastic member 66, a spring or a washer may be used.

By threading third screw 65 into fifth groove 61*d* of second holder body 61, second pressing member 63 is fixed to second holder body 61, and base 10 is pressed against fourth recess 61*a* of second holder body 61 by second pressing member 63.

As a result, throwaway insert 1 can be held at holder 60 (second holder body 61) for grinding.

Figure 11:
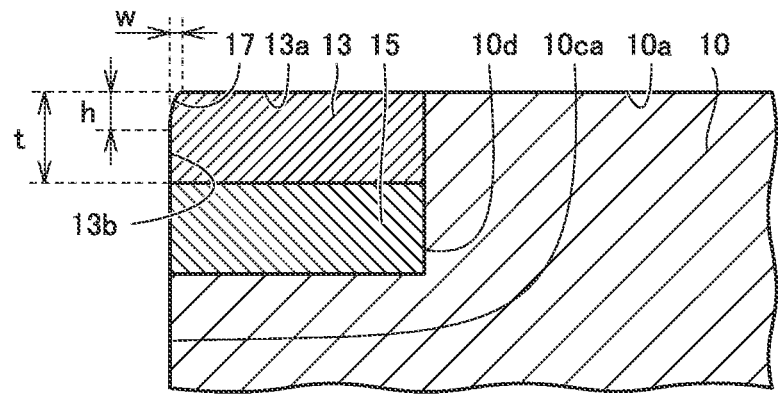
FIG. 11 (A) is a schematic cross sectional view of a throwaway insert according to a comparative example with a damage portion being generated in a cutting edge member.
Figure 11:
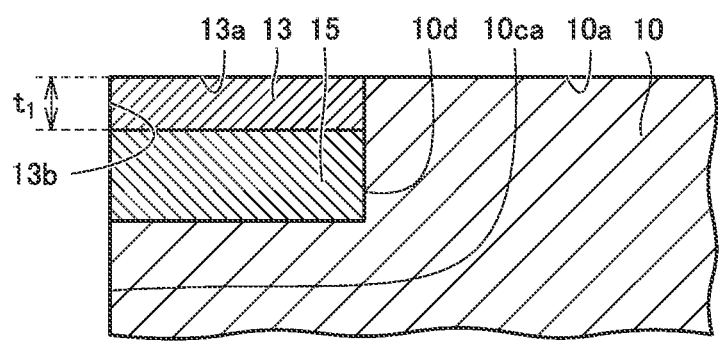

With reference to FIG. 10 (A) to FIG. 11 (B), the following describes functions and effects of throwaway insert 1 and the method of grinding cutting edge 14 of throwaway insert 1 in the present embodiment, in comparison with a comparative example.

With reference to FIG. 11 (A) and FIG. 11 (B), in a throwaway insert of the comparative example, flank face 13*b* of cutting edge member 13 is flush with one side surface 10*ca* of base 10. When a damage portion 17 is generated in cutting edge member 13 while cutting workpiece 40 using the throwaway insert of the comparative example, damage portion 17 is removed by grinding cutting edge member 13 in parallel with rake face 13*a* of cutting edge member 13. Specifically, rake face 13*a* of cutting edge member 13 and upper surface 10*a* of base 10 are ground by a size h of damage portion 17 in a direction perpendicular to rake face 13*a*. Thickness $t_1$ of cutting edge member 13 after the grinding (the length of cutting edge member 13 in the direction perpendicular to rake face 13*a*) is smaller than thickness t of cutting edge member 13 before grinding. In this manner, in the throwaway insert of the comparative example, cutting edge member 13 can be reused to cut workpiece 40.

On the other hand, with reference to FIG. 10 (A) and FIG. 10 (B), in throwaway insert 1 of the present embodiment, flank face 13*b* of cutting edge member 13 is located external to base 10 when viewed in the plan view from upper surface 10*a* of base 10. When damage portion 17 is generated in cutting edge member 13 while cutting workpiece 40 using throwaway insert 1 of the present embodiment, damage portion 17 is removed by grinding flank face 13*b* of cutting edge member 13.

Specifically, flank face 13*b* of cutting edge member 13 protruding relative to side surface 10*ca* of base 10 by distance $d_1$ is ground by a size w of damage portion 17 in the direction parallel to rake face 13*a*. Flank face 13*b* of cutting edge member 13 after the grinding protrudes relative to side surface 10*ca* of base 10 by a distance $d_3$ ($d_3$<Thickness t of cutting edge member 13 after the grinding (the length of cutting edge member 13 in the direction perpendicular to rake face 13*a*) is substantially the same as thickness t of cutting edge member 13 before the grinding. In this manner, in throwaway insert 1 of the present embodiment, cutting edge member 13 can be reused to cut workpiece 40.

Generally, size w of damage portion 17 in the direction parallel to rake face 13a is smaller than size h of damage portion 17 in the direction perpendicular to rake face 13a. A required amount of grinding of cutting edge member 13 to remove damage portion 17 in the present embodiment in which flank face 13b is ground can be reduced as compared with the comparative example in which rake face 13a is ground. Hence, in the present embodiment, the grinding of cutting edge member 13 for removing damage portion 17 in cutting edge member 13 can be performed a larger number of times than in the comparative example. According to throwaway insert 1 and the method of grinding cutting edge 14 of throwaway insert 1 in the present embodiment, the number of times of reusing cutting edge member 13 can be increased, whereby throwaway insert 1 can be used economically.

With reference to FIG. 11 (A) and FIG. 11 (B), rake face 13a is ground to remove damage portion 17 in the comparative example. Thickness $t_1$ of cutting edge member 13 after the grinding (the length of cutting edge member 13 in the direction perpendicular to rake face 13a) is smaller than thickness t of cutting edge member 13 before the grinding. The center height of cutting edge 14 after grinding cutting edge member 13 becomes different from the center height of cutting edge 14 before grinding cutting edge member 13. Accordingly, in the throwaway insert of the comparative example, cutting precision is decreased in the case of cutting workpiece 40 using cutting edge member 13 after the grinding, as compared with that in the case of cutting workpiece 40 using cutting edge member 13 before the grinding.

On the other hand, with reference to FIG. 10 (A) and FIG. 10 (B), in the present embodiment, flank face 13b of cutting edge member 13 is ground without grinding rake face 13a of cutting edge member 13 upon removing damage portion 17 of cutting edge member 13. Thickness t of cutting edge member 13 after the grinding (the length of cutting edge member 13 in the direction perpendicular to rake face 13a) is substantially the same as thickness t of cutting edge member 13 before the grinding. The center height of cutting edge 14 after grinding cutting edge member 13 can be maintained to be the same as the center height of cutting edge 14 before grinding cutting edge member 13. Hence, according to throwaway insert 1 and the method of grinding cutting edge 14 of throwaway insert 1 in the present embodiment, also after grinding cutting edge member 13, workpiece 40 can be cut with the same high cutting precision as that before grinding cutting edge member 13. According to throwaway insert 1 and the method of grinding cutting edge 14 of throwaway insert 1 in the present embodiment, the cutting performance of cutting edge member 13 including cutting edge 14 is not deteriorated after grinding cutting edge member 13 including cutting edge 14.

In throwaway insert 1 and the method of grinding cutting edge 14 of throwaway insert 1 in the present embodiment, flank face 13b, first connecting face 13c, and second connecting face 13f of cutting edge member 13 are located external to base 10 when viewed in the plan view from upper surface 10a of base 10. Therefore, cutting edge member 13 can be joined to base 10 at the entire surface of first recess 10d of base 10 using a brazing material. Therefore, according to throwaway insert 1 and the method of grinding cutting edge 14 of throwaway insert 1 in the present embodiment, cutting edge member 13 can be firmly joined to base 10.

In throwaway insert 1 and the method of grinding cutting edge 14 of throwaway insert 1 in the present embodiment, flank face 13b of cutting edge member 13 is located external to base 10 when viewed in the plan view from upper surface 10a of base 10. Hence, flank face 13b of cutting edge member 13 can be ground without grinding base 10. According to throwaway insert 1 and the method of grinding cutting edge 14 of throwaway insert 1 in the present embodiment, clogging in grindstone 51 and cracking in throwaway insert 1 can be prevented from occurring due to swarf of base 10 during the grinding of cutting edge member 13.

In throwaway insert 1 and the method of grinding cutting edge 14 of throwaway insert 1 in the present embodiment, second ridgeline 13e crosses first ridgeline 13d at an obtuse angle. The strength of the first end portion of cutting edge member 13, i.e., the region at which flank face 13b and first connecting face 13c cross each other in throwaway insert 1 of the present embodiment is larger than the strength of the first end portion of cutting edge member 13 in the throwaway insert of the comparative example in which second ridgeline 13e crosses first ridgeline 13d at an acute angle. Therefore, in the present embodiment, the first end portion of cutting edge member 13 can be suppressed from being chipped when grinding cutting edge member 13 of throwaway insert 1. According to throwaway insert 1 and the method of grinding cutting edge 14 of throwaway insert 1 in the present embodiment, it is possible to provide a throwaway insert having stable quality and a method of grinding a cutting edge of such a throwaway insert.

In throwaway insert 1 and the method of grinding cutting edge 14 of throwaway insert 1 in the present embodiment, fourth ridgeline 13g crosses first ridgeline 13d at an obtuse angle. The strength of the second end portion of cutting edge member 13, i.e., the region at which flank face 13b and second connecting face 13f cross each other in throwaway insert 1 of the present embodiment is larger than the strength of the second end portion of cutting edge member 13 in the throwaway insert of the comparative example in which fourth ridgeline 13g crosses first ridgeline 13d at an acute angle. Therefore, in the present embodiment, the second end portion of cutting edge member 13 can be suppressed from being chipped when grinding cutting edge member 13 of throwaway insert 1. According to throwaway insert 1 and the method of grinding cutting edge 14 of throwaway insert 1 in the present embodiment, it is possible to provide a throwaway insert having stable quality and a method of grinding a cutting edge of such a throwaway insert.

In throwaway insert 1 and the method of grinding cutting edge 14 of throwaway insert 1 in the present embodiment, second ridgeline 13e crosses first ridgeline 13d at an obtuse angle. Accordingly, in throwaway insert 1 of the present embodiment, a change in the length of cutting edge 14 (first ridgeline 13d) during the grinding of cutting edge member 13 of throwaway insert 1 can be reduced as compared with that in the throwaway insert of the comparative example in which second ridgeline 13e crosses first ridgeline 13d at an acute angle. Accordingly, the cutting depth of workpiece 40 by cutting edge member 13 after the grinding can be suppressed from being greatly changed from the cutting depth of workpiece 40 by cutting edge member 13 before the grinding.

In throwaway insert 1 and the method of grinding cutting edge 14 of throwaway insert 1 in the present embodiment, first ridgeline 13d includes first straight cutting edge portion 14a connected to second ridgeline 13e, and first straight cutting edge portion 14a may be parallel to third ridgeline 10e.

Each of the plurality of side surfaces 10c of base 10 is positioned precisely. When at least two of the plurality of side surfaces 10c of base 10 are bound to holder 30 for cutting or holder 60 for grinding, one side surface 10ca of base 10 can be used as a reference for checking a position of cutting edge member 13. Therefore, by checking the position of cutting edge member 13 including cutting edge 14 relative to workpiece 40 while observing a correlation between first straight cutting edge portion 14a of cutting edge member 13 and one side surface 10ca of base 10 including third ridgeline 10e parallel to first straight cutting edge portion 14a, cutting edge member 13 including cutting edge 14 can be positioned relative to workpiece 40 with high dimensional precision. This leads to improved precision in cutting workpiece 40 by throwaway insert 1. By checking the position of cutting edge member 13 including cutting edge 14 relative to grindstone 51 while observing the correlation between first straight cutting edge portion 14a of cutting edge member 13 and one side surface 10ca of base 10 including third ridgeline 10e parallel to first straight cutting edge portion 14a, cutting edge member 13 including cutting edge 14 can be positioned relative to grindstone 51 with high precision. This leads to improved precision in grinding cutting edge member 13, thereby obtaining high-quality cutting edge 14.

When binding base 10 of throwaway insert 1 to holder 30 for cutting, one side surface 10ca including third ridgeline 10e parallel to first straight cutting edge portion 14a may be bound to holder 30 for cutting. Therefore, cutting edge member 13 including cutting edge 14 can be readily positioned relative to workpiece 40 with high dimensional precision. Accordingly, precision in cutting workpiece 40 by throwaway insert 1 can be improved readily. When binding base 10 of throwaway insert 1 to holder 60 for grinding, one side surface 10ca including third ridgeline 10e parallel to first straight cutting edge portion 14a may be bound to holder 60 for grinding. Therefore, cutting edge member 13 including cutting edge 14 can be readily positioned relative to grindstone 51 with high precision. The precision in grinding cutting edge member 13 is improved readily, thereby obtaining high-quality cutting edge 14 readily. In throwaway insert 1 of the present embodiment, first ridgeline 13d may include second straight cutting edge portion 14c connected to fourth ridgeline 13g. Second straight cutting edge portion 14c may be parallel to fifth ridgeline 10g. The same effect can be obtained also when second straight cutting edge portion 14c is parallel to fifth ridgeline 10g.

In throwaway insert 1 of the present embodiment, distance $d_1$ between first ridgeline 13d and third ridgeline 10e when viewed in the plan view from upper surface 10a of base 10 may be more than or equal to 0.01 mm and less than or equal to 1 mm.

The protruding portion of cutting edge member 13 relative to one side surface 10ca of base 10 is not supported by base 10. As distance $d_1$ in which cutting edge member 13 protrudes relative to base 10 becomes larger, the rigidity of cutting edge member 13 is decreased, with the result that cutting edge member 13 is likely to be chipped during cutting of workpiece 40. Accordingly, the life of throwaway insert 1 becomes short and the quality of throwaway insert 1 becomes low. Moreover, as distance $d_1$ in which cutting edge member 13 protrudes relative to base 10 becomes larger, chatter vibration is likely to occur during cutting of workpiece 40, with the result that cutting precision is likely to be decreased.

On the other hand, by setting, at less than or equal to 1 mm, distance $d_1$ between first ridgeline 13d and third ridgeline 10e when viewed in the plan view from upper surface 10a of base 10 as in throwaway insert 1 of the present embodiment, the rigidity of cutting edge member 13 can be suppressed from being decreased and cutting edge member 13 can be suppressed from being chipped during cutting of workpiece 40. Accordingly, throwaway insert 1 has stable quality. Since the rigidity of cutting edge member 13 can be suppressed from being decreased, occurrence of chatter vibration can be prevented during cutting of workpiece 40. Therefore, decrease in cutting precision can be suppressed while securing minimally required cutting performance.

Moreover, by setting, at more than or equal to 0.01 mm, distance $d_1$ between first ridgeline 13d and third ridgeline 10e when viewed in the plan view from upper surface 10a of base 10, flank face 13b of cutting edge member 13 is ground without grinding base 10, whereby damage portion 17 of cutting edge member 13 can be completely removed. In this way, cutting edge member 13 can be reused to cut workpiece 40.

In throwaway insert 1 of the present embodiment, distance $d_2$ between first ridgeline 13d and fifth ridgeline 10g when viewed in the plan view from upper surface 10a of base 10 may be more than or equal to 0.01 mm and less than or equal to 1 mm. The same effect can be obtained also when distance $d_2$ between first ridgeline 13d and fifth ridgeline 10g is more than or equal to 0.01 mm and less than or equal to 1 mm.

In throwaway insert 1 of the present embodiment, cutting edge member 13 may further include second connecting face 13f connecting flank face 13b to the other side surface 10cb of two side surfaces 10ca, 10cb and extending to cross rake face 13a. When viewed in the plan view from upper surface 10a of base 10, second connecting face 13f may be located external to base 10. Fourth ridgeline 13g formed by rake face 13a and second connecting face 13f may cross first ridgeline 13d at an obtuse angle. First ridgeline 13d may include: first straight cutting edge portion 14a connected to second ridgeline 13e; and second straight cutting edge portion 14c connected to fourth ridgeline 13g. Crossing angle α (degree) between first ridgeline 13d and second ridgeline 13e may be more than or equal to (160−γ/2) and less than or equal to (200−γ/2), and may be preferably more than or equal to (170−γ/2) and less than or equal to (190−γ/2), where γ (degree) represents the angle between first straight cutting edge portion 14a and second straight cutting edge portion 14c when viewed in the plan view from upper surface 10a of base 10.

When crossing angle α (degree) between first ridgeline 13d and second ridgeline 13e is more than or equal to (160−γ/2) and less than or equal to (200−γ/2) and is preferably more than or equal to (170−γ/2) and less than or equal to (190−γ/2), the length of first straight cutting edge portion 14a after grinding cutting edge member 13 is substantially the same as the length of first straight cutting edge portion 14a before grinding cutting edge member 13. Accordingly, also after grinding cutting edge member 13, workpiece 40 can be cut to substantially the same cutting depth as that before grinding cutting edge member 13.

Crossing angle δ (degree) between first ridgeline 13d and fourth ridgeline 13g may be more than or equal to (160−γ/2) and less than or equal to (200−γ/2), and may be preferably more than or equal to (170−γ/2) and less than or equal to (190−γ/2), where γ (degree) represents the angle between first straight cutting edge portion 14a and second straight cutting edge portion 14c when viewed in the plan view from upper surface 10a of base 10. When crossing angle δ (degree) between first ridgeline 13d and fourth ridgeline 13g is more than or equal to (160−γ/2) and less than or equal to (200−γ/2) and is preferably more than or equal to (170−γ/2)

and less than or equal to (190−γ/2), the length of second straight cutting edge portion 14c after grinding cutting edge member 13 is substantially the same as the length of second straight cutting edge portion 14c before grinding cutting edge member 13. Accordingly, also after grinding cutting edge member 13, workpiece 40 can be cut to substantially the same cutting depth as that before grinding cutting edge member 13.

The method of grinding cutting edge 14 of throwaway insert 1 of the present embodiment includes: holding throwaway insert 1 at holder 60 for grinding; and grinding flank face 13b of cutting edge member 13 using grindstone 51 while moving grindstone 51 relative to cutting edge member 13. The grinding of flank face 13b may include grinding a portion of flank face 13b into a protruding curved surface.

In the method of grinding cutting edge 14 of throwaway insert 1 in the present embodiment, when viewed in the plan view from upper surface 10a of base 10, flank face 13b of cutting edge member 13 located external to base 10 is ground. In throwaway insert 1 having cutting edge 14 to be ground by the grinding method of the present embodiment, second ridgeline 13e formed by rake face 13a and first connecting face 13c of cutting edge member 13 crosses, at an obtuse angle, first ridgeline 13d formed by rake face 13a and flank face 13b of cutting edge member 13 and serving as cutting edge 14. Therefore, according to the method of grinding cutting edge 14 of throwaway insert 1 in the present embodiment, it is possible to provide a method of grinding a cutting edge of a throwaway insert having stable quality and including a cutting edge member that can be reused a larger number of times. According to the method of grinding cutting edge 14 of throwaway insert 1 in the present embodiment, the cutting performance of cutting edge member 13 including cutting edge 14 is not deteriorated after grinding cutting edge member 13 including cutting edge 14.

In the method of grinding cutting edge 14 of throwaway insert 1 in the present embodiment, holder 60 for grinding may bind two or more side surfaces 10cb, 10 cc of the plurality of side surfaces 10c of base 10. Since two or more side surfaces 10cb, 10 cc of the plurality of side surfaces 10c of base 10 of throwaway insert 1 are bound to holder 60 for grinding, cutting edge member 13 including cutting edge 14 can be positioned relative to grindstone 51 with high dimensional precision. According to the method of grinding cutting edge 14 of throwaway insert 1 in the present embodiment, high-quality cutting edge 14 is obtained.

Second Embodiment

Figure 12:
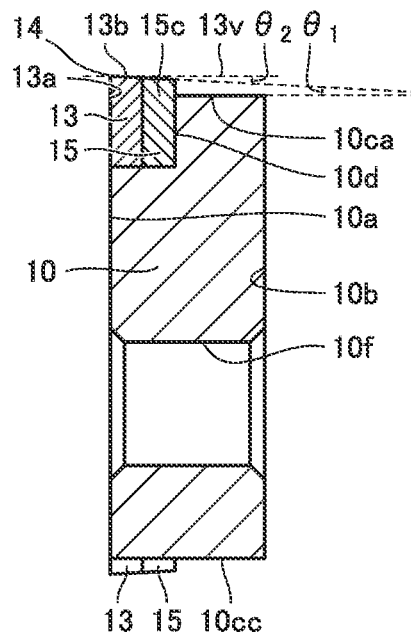
FIG. 12 is a schematic cross sectional view of a throwaway insert according to a second embodiment.

With reference to FIG. 12, the following describes a throwaway insert 2 of the second embodiment. Throwaway insert 2 of the present embodiment includes the same configuration as that of throwaway insert 1 of the first embodiment, but is different therefrom in the following points.

Flank face 13b of cutting edge member 13 is inclined relative to one side surface 10ca of base 10 such that flank face 13b of cutting edge member 13 becomes closer to one side surface 10ca of base 10 in a direction from upper surface 10a of base 10 toward lower surface 10b of base 10. Flank face 13b of cutting edge member 13 may be inclined at an inclination angle $\theta_1$ of more than or equal to 0.1° and less than or equal to 7° relative to one side surface 10ca of base 10. Flank face 13b of cutting edge member 13 may be inclined relative to the other side surface 10cb of base 10 such that flank face 13b of cutting edge member 13 becomes closer to the other side surface 10cb of base 10 in the direction from upper surface 10a of base 10 toward lower surface 10b of base 10. Flank face 13b of cutting edge member 13 may be inclined relative to the other side surface 10cb of base 10 at an inclination angle of more than or equal to 0.1° and less than or equal to 7°. The inclination angle of flank face 13b of cutting edge member 13 relative to the other side surface 10cb of base 10 may be equal to inclination angle $\theta_1$ of flank face 13b of cutting edge member 13 relative to one side surface 10ca of base 10.

When viewed in the plan view from rake face 13a, flank face 13b is inclined relative to rake face 13a such that flank face 13b becomes closer to the two side surfaces (10ca, 10cb) of base 10 as flank face 13b is further away from rake face 13a. In a cross section (cross section shown in FIG. 12) orthogonal to rake face 13a and orthogonal to cutting edge 14 when viewed in a plan view from rake face 13a, flank face 13b is inclined relative to rake face 13a such that flank face 13b becomes closer to the two side surfaces (10ca, 10cb) of base 10 as flank face 13b is further away from rake face 13a. As shown in FIG. 12, flank face 13b is inclined relative to rake face 13a such that cutting edge member 13 becomes gradually thinner as flank face 13b becomes closer to lower surface 10b relative to rake face 21.

Flank face 13b may be inclined relative to an imaginary plane that is orthogonal to rake face 13a and that is in contact with cutting edge 14 at an inclination angle $\theta_2$ of more than or equal to 0.1° and less than or equal to 7°. In the cross section (cross section shown in FIG. 12) orthogonal to rake face 13a and orthogonal to cutting edge 14 when viewed in the plan view from rake face 13a, flank face 13b may be inclined relative to a normal line 13v of rake face 13a at an inclination angle $\theta_2$ of more than or equal to 0.1° and less than or equal to 7° such that flank face 13b becomes closer to the two side surfaces (10ca, 10cb) of base 10 as flank face 13b is further away from rake face 13a. Inclination angle $\theta_2$ may be equal to inclination angle $\theta_1$.

Side surface 15c of backing body 15 may be inclined relative to one side surface 10ca of base 10 such that side surface 15c of backing body 15 becomes closer to one side surface 10ca of base 10 in the direction from upper surface 10a of base 10 toward lower surface 10b of base 10. Side surface 15c of backing body 15 may be inclined relative to the other side surface 10cb of base 10 such that side surface 15c of backing body 15 becomes closer to the other side surface 10cb of base 10 in the direction from upper surface 10a of base 10 toward lower surface 10b of base 10. Side surface 15c of backing body 15 may be flush with flank face 13b of cutting edge member 13. As one modification of the present embodiment, side surface 15c of backing body 15 may be flush with two side surfaces 10ca, 10cb of base 10, flank face 13b of cutting edge member 13 may protrude relative to two side surfaces 10ca, 10cb of base 10 and side surface 15c of backing body 15.

As with the first embodiment, throwaway insert 2 of the present embodiment can be held at holder 30 for cutting so as to cut workpiece 40. As with the first embodiment, throwaway insert 2 of the present embodiment can be held at holder 60 for grinding so as to grind cutting edge 14 of cutting edge member 13.

The following describes functions and effects of throwaway insert 2 of the present embodiment. In addition to the effects of throwaway insert 1 of the first embodiment, throwaway insert 2 of the present embodiment exhibits the following effects.

In throwaway insert 2 of the present embodiment, when viewed in the plan view from upper surface 10a of base 10, flank face 13b and first connecting face 13c of cutting edge member 13 are located external to base 10 and flank face 13b of cutting edge member 13 is inclined relative to one side surface 10ca of base 10. Since flank face 13b of cutting edge member 13 is inclined relative to one side surface 10ca of base 10, a flank amount of flank face 13b of cutting edge member 13 relative to the surface of workpiece 40 can be increased. Therefore, wearing of flank face 13b of cutting edge member 13 can be reduced during cutting of workpiece 40, thereby improving the life of throwaway insert 2.

Moreover, as the distance in which cutting edge member 13 protrudes relative to base 10 becomes larger, chatter vibration is likely to occur during cutting of workpiece 40, with the result that cutting precision is likely to be decreased. In the present embodiment, since flank face 13b of cutting edge member 13 is inclined relative to one side surface 10ca of base 10, cutting performance of cutting edge 14 is improved. Therefore, even though cutting edge member 13 protrudes relative to one side surface 10ca of base 10, occurrence of chatter vibration can be suppressed during cutting of workpiece 40, whereby cutting precision can be suppressed from being decreased.

The same effect can be obtained also in the case where flank face 13b and second connecting face 13f of cutting edge member 13 are located external to base 10 when viewed in the plan view from upper surface 10a of base 10 and where flank face 13b of cutting edge member 13 is inclined relative to the other side surface 10cb of base 10 such that flank face 13b of cutting edge member 13 becomes closer to the other side surface 10cb of base 10 in the direction from upper surface 10a of base 10 toward lower surface 10b of base 10.

Flank face 13b of cutting edge member 13 may be inclined relative to one side surface 10ca of base 10 at an inclination angle $\theta_1$ of more than or equal to 0.1° and less than or equal to 7°. By setting, at more than or equal to 0.1°, inclination angle $\theta_1$ of flank face 13b of cutting edge member 13 relative to one side surface 10ca of base 10, wearing of flank face 13b of cutting edge member 13 and occurrence of chatter vibration can be further suppressed during cutting. If flank face 13b of cutting edge member 13 is inclined relative to one side surface 10ca of base 10 at more than 7°, grindstone 51 interferes with base 10 when grinding flank face 13b of cutting edge member 13 using grindstone 51, with the result that a portion of base 10 may be also ground. By setting, at less than or equal to 7°, inclination angle $\theta_1$ of flank face 13b of cutting edge member 13 relative to one side surface 10ca of base 10 as in the present embodiment, flank face 13b of cutting edge member 13 can be ground while avoiding grindstone 51 from interfering with base 10. The same effect can be obtained also when flank face 13b of cutting edge member 13 is inclined relative to the other side surface 10cb of base 10 at an angle of more than or equal to 0.1° and less than or equal to 7°.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 1, 2: throwaway insert; 10: base; 10a: upper surface; 10b: lower surface; 10c: plurality of side surfaces; 10ca, 10cb, 10cc: side surface; 10d: first recess; 10e: third ridgeline; 10f: hole; 10g: fifth ridgeline; 13: cutting edge member; 13a: rake face; 13b: flank face; 13c: first connecting face; 13d: first ridgeline; 13e: second ridgeline; 13f: second connecting face; 13g: fourth ridgeline; 14: cutting edge; 14a: first straight cutting edge portion; 14b: curved cutting edge portion; 14c: second straight cutting edge portion; 15: backing body; 15c: side surface; 17: damage portion; 30: holder for cutting; 31: first holder body; 31a: second recess; 31b: third recess; 31c: first groove; 31d: second groove; 31e: third groove; 31f: swarf pocket; 33: first pressing member; 33a: first protrusion; 33b: second protrusion; 33c: first through hole; 35: first screw; 36: first elastic member; 37: underlying plate; 38: second screw; 40: workpiece; 50: grinding wheel; 51: grindstone; 52: core; 53: rotation axis; 60: holder for grinding; 61: second holder body; 61a: fourth recess; 61b: fifth recess; 61c: fourth groove; 61d: fifth groove; 63: second pressing member; 63a: third protrusion; 63b: fourth protrusion; 63c: second through hole; 65: third screw; 66: second elastic member.

The invention claimed is:

1. A throwaway insert comprising:
a base having an upper surface, a lower surface, and a plurality of side surfaces that connect the upper surface and the lower surface to each other, the base being provided with a first recess at a corner portion at which the upper surface crosses two side surfaces of the plurality of side surfaces, wherein the first recess defines a ledge surface of the base, the ledge surface protruding beyond the upper surface in a direction from a center of the base toward a tip of the corner portion, wherein the two side surfaces of the plurality of side surfaces intersect the ledge surface; and
a cutting edge member located on the ledge surface, the cutting edge member including
 a rake face extending along the upper surface,
 a flank face extending to cross the rake face,
 a first connecting face connecting the flank face to one side surface of the two side surfaces and extending to cross the rake face, and
 a first ridgeline formed by the rake face and the flank face and serving as a cutting edge,
all parts in each of the flank face and the first connecting face protrude from and overhang, in their entirety, the two side surfaces of the plurality of side surfaces,
a second ridgeline formed by the rake face and the first connecting face, the second ridgeline intersecting the first ridgeline at a first obtuse angle,
a straight ridgeline connected to a corner of the second ridgeline and a corner of a ridgeline paired with the second ridgeline, wherein the ridgeline paired with the second ridgeline is formed by the rake face and a second connecting face, the ridgeline paired with the second ridgeline intersecting the first ridgeline, the second connecting face connecting the flank face to an other side surface of the two side surfaces of the base, and the straight ridgeline intersecting the second ridgeline at a second obtuse angle,
when viewed in a side cross-section, a height of the flank face is substantially the same as a height of the upper surface of the base, and
the side cross-section is perpendicular to the rake face and the upper surface of the base.

2. The throwaway insert according to claim 1, wherein the first ridgeline includes a first straight cutting edge portion connected to the second ridgeline, and the first straight cutting edge portion is parallel to a third ridgeline formed by the upper surface of the base and the one side surface of the base.

3. The throwaway insert according to claim 2, wherein a distance between the first ridgeline and the third ridgeline when viewed in the plan view from the upper surface of the base is more than or equal to 0.01 mm and less than or equal to 1 mm.

4. The throwaway insert according to claim 1, wherein
the cutting edge member further includes the second connecting face connecting the flank face to the other side surface of the two side surfaces and extending to cross the rake face,
when viewed in the plan view from the upper surface of the base, the second connecting face is located external to the base,
the ridgeline paired with the second ridgeline formed by the rake face and the second connecting face intersects the first ridgeline at an obtuse angle,
the first ridgeline includes a first straight cutting edge portion connected to the second ridgeline, and a second straight cutting edge portion connected to the ridgeline paired with the second ridgeline, and
a crossing angle a between the first ridgeline and the second ridgeline is more than or equal to $160°-\gamma/2$ and less than or equal to $200°-\gamma/2$, where y represents an angle in degrees between the first straight cutting edge portion and the second straight cutting edge portion when viewed in the plan view from the upper surface of the base.

5. The throwaway insert according to claim 1, wherein the flank face of the cutting edge member is inclined relative to the one side surface of the base such that the flank face of the cutting edge member becomes closer to the one side surface of the base in a direction from the upper surface of the base toward the lower surface of the base.

6. The throwaway insert according to claim 5, wherein the flank face of the cutting edge member is inclined relative to the one side surface of the base at an inclination angle of more than or equal to 0.1° and less than or equal to 7°.

7. The throwaway insert according to claim 1, wherein the cutting edge member includes one of the following materials: diamond, cubic boron nitride, cemented carbide and cermet.

8. The throwaway insert according to claim 1, wherein
the first ridgeline includes a first straight cutting edge portion, a second straight cutting edge portion, and a curved cutting edge portion having a convex curved shape between the first straight cutting edge portion and the second straight cutting edge portion.

9. The throwaway insert according to claim 1, wherein
the base includes a base straight ridgeline abutting the straight ridgeline, and
a length of the straight ridgeline is substantially the same as a length of the base straight ridgeline in the plan view from the upper surface of the base.

10. The throwaway insert according to claim 1, wherein the first obtuse angle is more than or equal to 110° and less than or equal to 165°.

11. A method of grinding a cutting edge of a throwaway insert, the method comprising:
holding the throwaway insert recited in claim 1 at a holder for grinding; and
grinding the flank face of the cutting edge member using a grindstone while moving the grindstone relative to the cutting edge member,
the grinding of the flank face including grinding a portion of the flank face into a protruding curved surface.

12. The method of grinding the cutting edge of the throwaway insert according to claim 11, wherein the holder for grinding is configured to bind two or more side surfaces of the plurality of side surfaces of the base.

\* \* \* \* \*